F. J. STALEY.
HEAD-BLOCKS FOR SAW-MILLS.
No. 6,808. Reissued Dec. 14, 1875.
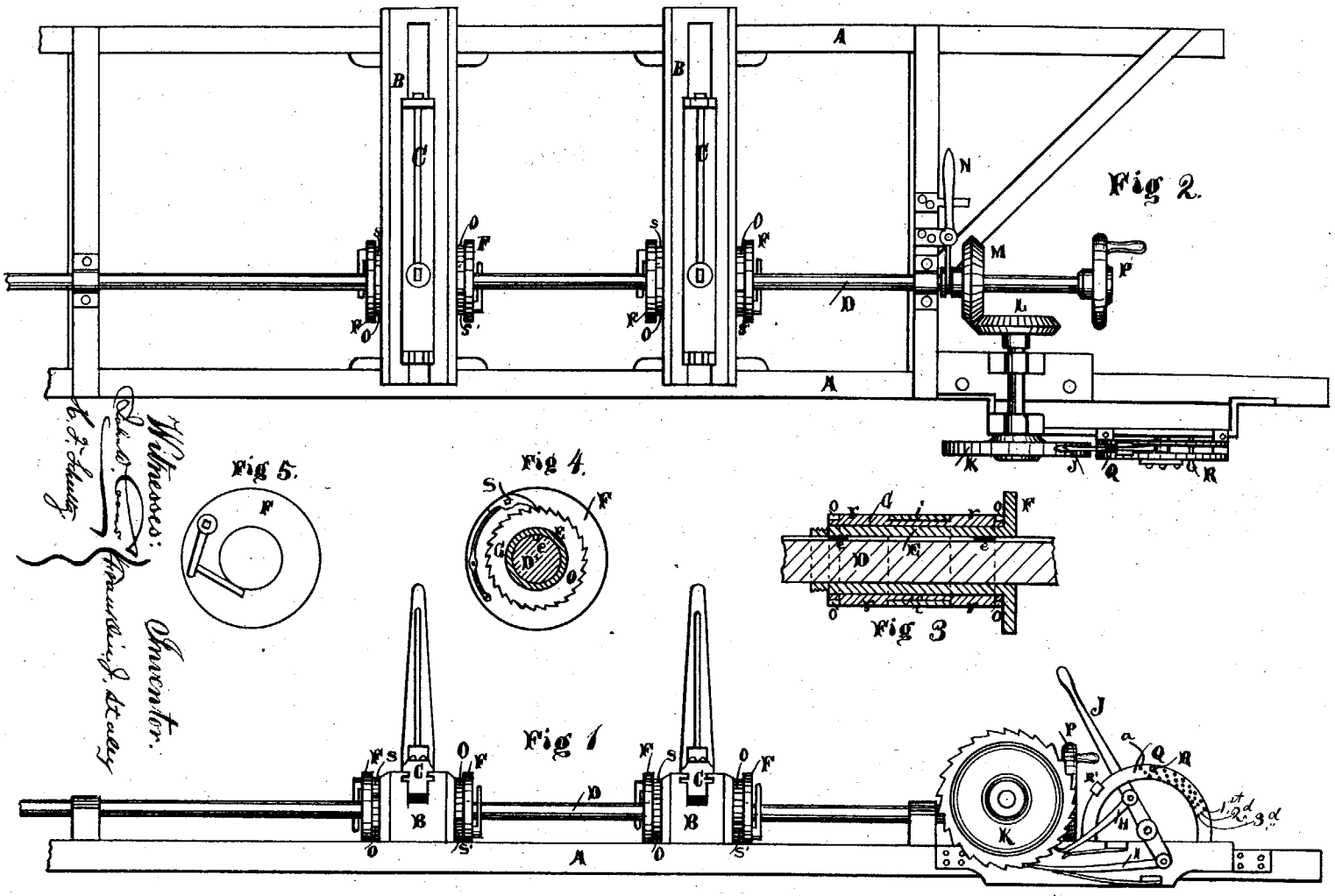
N. PETERS, PHOTO-LITHOGRAPHER, WASHINGTON, D. C.

UNITED STATES PATENT OFFICE.

FRANKLIN J. STALEY, OF INDIANAPOLIS, INDIANA, ASSIGNOR, BY MESNE ASSIGNMENTS, TO ERASTUS O. FRINK, OF SAME PLACE.

IMPROVEMENT IN HEAD-BLOCKS FOR SAW-MILLS.

Specification forming part of Letters Patent No. 98,215, dated December 21, 1869; reissue No 6,808, dated December 14, 1875; application filed May 19, 1875.

*To all whom it may concern:*

Be it known that I, FRANKLIN J. STALEY, of Indianapolis, county of Marion and State of Indiana, have invented certain new and useful Improvements in Head-Blocks for Saw-Mills; and I do hereby declare the following to be a full, clear, and exact description thereof, reference being had to the accompanying drawings and the letters of reference marked thereon.

Previous to my invention a great many devices or mechanisms have been suggested and patented adapted to serve the purposes of sawing lumber of different thicknesses.

My invention relates to that class of mechanism which is intended to operate the knees of the head-blocks by employing a longitudinal setting-shaft usually employed for operating the knees, and a ratchet-wheel, so spaced as to move the knees of the head-block one thirty-second part of an inch to every click of the pawls, which are secured direct to the lever, the lever working in a segmental arch, and arranged to actuate the setting-shaft in such a manner that both knees may be moved simultaneously toward the saw, as in sawing lumber of equal thicknesses, and so that either knee may be moved toward the saw while the other remains at rest, as in sawing tapering lumber or logs that are larger at one end than at the other; also, so that the knees may be moved in like manner quickly backward or from the saw into position to receive another log; also, in the manner of constructing the segmental arch, which is properly spaced off and drilled with two or more rows of holes at the proper places to receive a gage-pin; the object being to have a complete and ready control over the movement of the knees for the purpose of setting the log, and to allow the setting mechanism to set the log to any desired fraction of an inch, even to a thirty-second part, which will be readily appreciated by users of saw-mills.

In the drawings, Figure 1 represents a side elevation of a log-carriage on which are arranged the head-blocks and setting mechanism embodying my improvement. Fig. 2 is a plan of the same. Fig. 3 is a detail vertical longitudinal section of the device attached to and forming part of the head-blocks for actuating the knees. Fig. 4 is a transverse section of the same, showing the inside of one of the flanges with a pawl and spring attached. Fig. 5 is an exterior view of one of the flanges.

A is a log-carriage made and operated in the usual manner. B B represent the head-blocks, furnished with knees C C in the ordinary manner. The device for operating the knees to set the log consists of the longitudinal setting-shaft D, which passes through the sleeve E, fitting neatly but working freely therein, and having collars F on the ends, one of which is cast permanent on one end of the sleeve, and the other is screwed on so as to be removable. The keys *e e* are attached to the inner side of the sleeve E, and project so as to enter the key-seat, which is cut the whole length of the shaft D. These keys prevent the sleeve E and collars F from turning on the shaft D, and at the same time are so arranged as to allow the position of the head-blocks B B to be changed along the log-carriage to adapt them to logs of different lengths at pleasure. Surrounding the sleeve E is a casting, G, that fits neatly and works freely thereon. The casting G has cogs *i i* around its center that gear with cogs on the under side of the knees C C. The outer ends of the casting G are furnished with ratchet-cogs O O, and between the ratchet-wheels and center cogs *i i* are the bearings *r r*, that work in the sides of the head-blocks B B. *s s'*, Fig. 2, are pawls pivoted to the collars F, that engage with the ratchets O O, the latter being arranged to work in opposite directions, the one on the left operating to move the knees from the saw, and that on the right moving them toward the saw. The setting-shaft D is operated by double pawls H and I, which are attached direct to the lever J. The pawls are made in pairs, one of which in each pair is made half the length of a tooth shorter than the other. By this arrangement the teeth in the ratchet-wheel K can be made double the size that otherwise would be required, thereby securing greater strength and durability of the teeth, and getting in measurement just one thirty-second part of an inch to each click of the pawls H and I on the knees C C. The bevel-wheel M is made so as to be disengaged from the bevel-wheel L in the usual manner of arranging such wheels by means of the lever N. Immediately in front of the ratchet-wheel K, or in any other convenient position, is arranged the segmental arch Q. This arch forms a guide for the lever J, and has a stop, R′, made adjustable and clamped to the arch Q at any desired point for starting the lever I.

What I claim as new and novel, and wish to secure by Letters Patent, is—

1. The sleeve E, furnished with the flanges F and pawls S S′ and keys *e e*, concentric piece E, furnished with cogs *i i* and ratchets O O, in combination with the setting-shaft D, furnished with the hand crank-wheel P and knees C C, all constructed and arranged substantially as and for the purpose set forth.

2. The ratchet-wheel K, lever J, with the pawls H and I, arranged in pairs and attached to the lever, as described, in combination with the bevel-wheels L and M, setting shaft D, and segmental arch Q, constructed and arranged to operate the knees of the head-blocks, substantially as specified.

3. The segmental arch Q, in combination with the lever J, pawls H I, ratchet K, and setting-shaft D, constructed and operated substantially as and for the purpose set forth.

4. The segmental arch Q, having holes properly spaced and drilled therein, in combination with the lever J and stops R′ and R, pawls H and I, constructed and operated as herein specified, for the purpose of getting fractional parts of an inch, substantially as described and set forth.

In witness whereof I have signed my name to these specifications in the presence of two witnesses.

FRANKLIN J. STALEY.

Witnesses:
ERASTUS T. BUSSELL,
E. D. SCUDDER.